United States Patent
Straessler et al.

(10) Patent No.: US 10,696,786 B2
(45) Date of Patent: Jun. 30, 2020

(54) METHODS OF PRODUCING ENERGETIC POLYMERS, ENERGETIC BINDERS, AND ENERGETIC COMPOSITIONS

(71) Applicant: Northrop Grumman Innovation Systems, Inc., Plymouth, MN (US)

(72) Inventors: Nicholas A. Straessler, North Salt Lake, UT (US); Michael O. Killpack, Brigham City, UT (US); Daniel W. Doll, Culpeper, VA (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 317 days.

(21) Appl. No.: 14/567,334

(22) Filed: Dec. 11, 2014

(65) Prior Publication Data

US 2016/0168317 A1  Jun. 16, 2016

(51) Int. Cl.
| | |
|---|---|
| C08G 63/16 | (2006.01) |
| C08G 63/91 | (2006.01) |
| C08G 18/46 | (2006.01) |
| C06B 25/00 | (2006.01) |
| C06B 25/34 | (2006.01) |
| C06B 25/04 | (2006.01) |
| C06B 45/10 | (2006.01) |
| C08G 63/685 | (2006.01) |

(52) U.S. Cl.
CPC .............. *C08G 63/16* (2013.01); *C06B 25/00* (2013.01); *C06B 25/04* (2013.01); *C06B 25/34* (2013.01); *C06B 45/105* (2013.01); *C08G 18/463* (2013.01); *C08G 63/685* (2013.01); *C08G 63/916* (2013.01)

(58) Field of Classification Search
CPC ................................. C08G 63/16; C06B 25/00
See application file for complete search history.

(56) References Cited

U.S. PATENT DOCUMENTS

| | | | | |
|---|---|---|---|---|
| 2,978,475 A * | 4/1961 | Klager | .................. | C06B 45/105 149/47 |
| 3,000,719 A | 9/1961 | Gold et al. | | |
| 3,000,932 A * | 9/1961 | Klager | .................... | C06B 25/00 560/156 |
| 3,182,041 A | 5/1965 | Watkins et al. | | |
| 3,396,187 A * | 8/1968 | Benziger | ................. | C06B 25/00 149/88 |
| 3,586,707 A * | 6/1971 | Hall | ...................... | C07C 201/12 358/434 |
| 3,745,076 A | 7/1973 | Sickman et al. | | |
| 4,201,853 A | 5/1980 | Henry et al. | | |
| H253 H * | 4/1987 | Sitzmann | ...................... | 549/321 |
| 4,910,322 A | 3/1990 | Grakauskas et al. | | |
| 4,988,397 A * | 1/1991 | Adolph | .................. | C06B 45/105 149/19.3 |
| 5,844,165 A | 12/1998 | Canterberry et al. | | |
| 5,955,629 A | 9/1999 | Canterberry et al. | | |
| 6,425,966 B1 * | 7/2002 | Highsmith | ............ | C06B 45/105 149/19.1 |
| 6,835,255 B2 | 12/2004 | Moser, Jr. | | |
| 7,067,024 B2 | 6/2006 | Doll et al. | | |
| 2003/0082235 A1* | 5/2003 | Cohn | ..................... | A61K 47/34 424/486 |
| 2011/0319643 A1* | 12/2011 | Thompson | ............ | C07C 247/04 552/11 |

OTHER PUBLICATIONS

Garver, Lee et al., "Catalyzed Oxidative Nitration of Nitronate Salts" Fluorochem, Inc., Oct. 5, 1984, pp. 1699-1702.
Hiskey, Michael et al., "Improved synthetic routes to polymitroheterocycles" Journal of Energetic Materials, Los Alamos National Laboratory, Explosives Technology Group, Dec. 1, 2006, 15 pages.
Jin, Bo et al., "Synthesis and Characterization of Poly(vinyl 2,4,6-trinitrophenylacetal) as a New Energetic Binder" School of Chemical Engineering and Environment, Beijng Institute if Technology, Nov. 15, 2010, 6 pages.

* cited by examiner

*Primary Examiner* — Aileen B Felton
(74) *Attorney, Agent, or Firm* — TraskBritt

(57) ABSTRACT

A method of producing an energetic polymer comprises reacting at least one energetic diol with at least one of a diacid halide and a diacid halide derivative to produce a geminal dinitro polyester. A method of producing an energetic binder, and a method of producing an energetic composition are also described.

22 Claims, No Drawings

METHODS OF PRODUCING ENERGETIC POLYMERS, ENERGETIC BINDERS, AND ENERGETIC COMPOSITIONS

STATEMENT REGARDING FEDERALLY SPONSORED RESEARCH OR DEVELOPMENT

This invention was made with government support under Contract Number W15QKN-09-9-1001, Subcontract Number 2010-361, awarded by the United States Department of Defense. The government has certain rights in the invention.

TECHNICAL FIELD

Embodiments of the disclosure relate to methods of producing energetic polymers, energetic binders, and energetic compositions. More specifically, embodiments of the disclosure relate to methods of producing geminal dinitro polyesters, and related methods of producing energetic binders and energetic compositions.

BACKGROUND

Solid propellants and explosives generally comprise an energetic composition (e.g., formulation) including a fuel source, an oxidizer, and at least one of a binder and a plasticizer. Highly energetic compositions often utilize energetic polymers as binders and/or plasticizers for enhanced energetic performance. Such energetic polymers frequently include nitrogen-containing explosophores, such as nitro groups ($-NO_2$), fluorodinitro groups ($FC(NO_2)_2$ and/or difluoroamino groups ($-NF_2$).

Energetic polymers including geminal dinitro groups ($-C(NO_2)_2$) have been of particular interest for use as binders and plasticizers in energetic compositions since such energetic polymers typically exhibit low sensitivity to unplanned stimuli, supporting the creation of munitions meeting Insensitive Munition (IM) requirements. Such energetic polymers are also attractive due to their high oxygen content and high energy.

It would be desirable to have new methods of producing energetic polymers, such as energetic polymers including geminal dinitro groups. It would also be desirable if such methods could be used to control the molecular weight and reactive functionalities of such energetic polymers. Such methods could be utilized to produce energetic binders and energetic compositions exhibiting desirable characteristics.

BRIEF SUMMARY

In accordance with one embodiment described herein, a method of producing an energetic polymer comprises reacting at least one energetic diol with at least one of a diacid halide and a diacid halide derivative to produce a geminal dinitro polyester.

In additional embodiments, a method of producing an energetic binder comprises reacting at least one energetic diol with at least one of a diacid halide and a diacid halide derivative to produce a geminal dinitro polyester. Polymer chains of the geminal dinitro polyester are crosslinked to produce the energetic binder.

In yet additional embodiments, a method of producing an energetic composition comprises reacting at least one energetic diol with at least one of a diacid halide and a diacid halide derivative to produce a geminal dinitro polyester. Polymer chains of the geminal dinitro polyester are crosslinked to produce an energetic binder. The energetic binder is combined with at least one additional energetic material to produce the energetic composition.

DETAILED DESCRIPTION

Methods of producing an energetic polymer are disclosed, as are methods of producing an energetic binder, and methods of producing an energetic composition. For example, in some embodiments, a method of producing an energetic polymer includes combining at least one energetic diol and at least one diacid halide (and/or at least one derivative thereof) in an organic solvent, and condensing the energetic diol with the diacid halide (and/or the derivative thereof) to produce an energetic polyester. A polymerization promoter (e.g., an acid scavenger) may, optionally, be used to promote the condensation of the energetic diol with the diacid halide. The types, amounts, addition orders, and addition rates of the energetic diol, the diacid halide (and/or the derivative thereof), and any other materials (e.g., the organic solvent, the polymerization promoter (if any), etc.) may be selected to control one or more properties (e.g., molecular weight, reactive capping groups, energetic performance, sensitivity, etc.) of the energetic polyester. The energetic polymer may be reacted with a crosslinking agent to produce an energetic binder, which may be utilized to produce a desired energetic composition. The methods of the disclosure provide a simple and efficient means of producing energetic polymers, energetic binders, and energetic compositions exhibiting desirable properties.

The following description provides specific details, such as material compositions, and processing conditions (e.g., temperatures, pressures, material addition rates, etc.) in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional systems and methods employed in the industry. In addition, only those process components and acts necessary to understand the embodiments of the disclosure are described in detail below. A person of ordinary skill in the art will understand that some process components are inherently included herein and that adding various conventional process components and acts would be in accord with the disclosure.

As used herein, the terms "comprising," "including," "containing," "characterized by," and grammatical equivalents thereof are inclusive or open-ended terms that do not exclude additional, unrecited elements or method steps, but also include the more restrictive teams "consisting of and" consisting essentially of and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, "and/or" includes any and all combinations of one or more of the associated listed items.

As used herein, relational terms, such as "first," "second," "over," "top," "bottom," "underlying," etc., are used for clarity and convenience in understanding the disclosure and accompanying drawings and does not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the term "solution" means and includes a solution of a material in a solvent, a suspension of the material in the solvent, an emulsion of the material in the solvent, or combinations thereof. Since a person of ordinary skill in the art will recognize whether a particular reference describes a solution, a suspension, an emulsion or a combination thereof from the context, for the purposes of readability and claiming the invention, the term "solution" refers collectively to a solution, a suspension, an emulsion, or a combination thereof.

In accordance with embodiments of the disclosure, an energetic diol may be combined with a diacid halide (and/or a derivative of a diacid halide) and an organic solvent to facilitate a condensation reaction between the energetic diol and the diacid halide (and/or the derivative of the diacid halide) to produce an energetic polymer (e.g., an energetic polyester) exhibiting desired characteristics (e.g., molecular weight, reactive capping groups, energetic performance, sensitivity, etc.). The energetic polymer may be produced from the energetic diol and the diacid halide in the absence of (e.g., without the use of) an organic acid catalyst. In some embodiments, a polymerization promoter (e.g., an acid scavenger) may also be combined with the energetic diol, the diacid halide (and/or the derivative of the diacid halide), and the organic solvent to facilitate or enhance the formation of the energetic polymer.

As used herein, the term "energetic diol" means and includes a diol exhibiting at least one energetic group (e.g., explosophore), such as at least one nitro group (—$NO_2$) and/or at least one fluorodinitromethyl group ($F(NO_2)_2C$—). In some embodiments, the energetic diol comprises a polynitroakyldiol including nitro groups substituted in the beta position. Non-limiting examples of suitable polynitroakyldiols include 2,2-dinitro-1,3-propanediol (A-diol) and 2,2,8,8-tetranitro-4,6-dioxa-1,9-nonanediol (DINOL). In some embodiments, the energetic diol is A-diol, which has the following chemical formula:

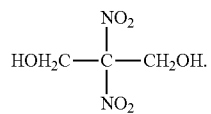

The energetic diol may be produced by conventional processes, which are not described in detail herein. As a non-limiting example, if the energetic diol comprises A-diol, the A-diol may be produced using an oxidative nitration process such as those disclosed in L. Garver et. al, *Catalyzed Oxidative Nitration of Nitronate Salts*, Journal of Organic Chemistry 50, 1699-1702 (1985), and M. Hiskey et. al, *Improved Synthetic Route to Polynitroheterocycles*, Journal of Energetic Materials 17, 379-391 (1999), the disclosure of each of which is hereby incorporated herein it its entirety by reference.

The diacid halide may comprise at least one of an aliphatic diacid halide, a cycloaliphatic diacid halide, and an aromatic diacid halide. As a non-limiting example, the diacid halide may comprise at least one linear diacid chloride, such as at least one of oxalyl chloride, malonyl chloride, succinyl chloride, glutaryl chloride, adipoyl chloride, pimeloyl chloride, suberoyl chloride, azelaoyl chloride, diglycolyl chloride, and sebacoyl chloride. As another non-limiting example, the diacid halide may comprise at least one non-linear diacid chloride, such as at least one of 1,2-cyclobutanedicarbonylchloride, isophthaloyl chloride, and terephthaloyl chloride. As a further non-limiting example, the diacid halide may comprise at least one of a diacid bromide and a diacid iodide. In some embodiments, the diacid halide is sebacoyl chloride ($C_{10}H_{16}Cl_2O_2$). In additional embodiments, the diacid halide is a linear diacid chloride having a shorter chain length than sebacoyl chloride. Suitable diacid halides are commercially available from numerous sources including, but not limited to, Sigma-Aldrich Co. (St. Louis, Mo.).

In some embodiments, a derivative of a diacid halide may be utilized to produce the energetic polymer. The derivative of a diacid halide may be used in place of or in conjunction with the diacid halide in a condensation reaction with the energetic diol to produce the energetic polymer. As a non-limiting example, an acyl ammonium salt produced from a diacid halide may be used in place of the diacid halide to condense the energetic diol and produce an energetic polymer. The acyl ammonium salt may, for example, be produced through a reaction between the diacid halide and an amine (e.g., pyridine, a triethylene diamine, triethylamine, etc.), as described in further detail below. In some embodiments, the use of an acyl ammonium salt derived from a diacid halide (e.g., in place of or in conjunction with the diacid halide) may facilitate the relatively rapid production an energetic polymer exhibiting relatively higher molecular weight.

The condensation reaction between the energetic diol and the diacid halide (and/or the derivative thereof) may be conducted in at least one organic solvent in which the energetic diol and the diacid halide are at least partially soluble. Suitable organic solvents include, but are not limited to, non-polar organic solvents (e.g., pentane, cyclopentane, hexane, cyclohexane, benzene, toluene, 1,4-dioxane, chloroform, diethyl ether, dichloromethane, trichloroethane, tetrachloroethane, etc.), and non-carbonyl-containing polar aprotic organic solvents (e.g., tetrahydrofuran, acetonitrile, nitromethane, etc.). In some embodiments, the organic solvent is dichloromethane (DCM). In additional embodiments, the organic solvent is tetrahydrofuran (THF). Suitable organic solvents are commercially available from numerous sources including, but not limited to, Sigma-Aldrich Co. (St. Louis, Mo.). The concentration of the energetic diol and the diacid halide (or the derivative thereof) within the organic solvent may each be greater than or equal to about 0.1 M, such as within a range of from about 0.1 M to about 0.5 M. Higher concentrations of the reactants in the organic solvent may result in the production of a relatively higher molecular weight energetic polymer.

A polymerization promoter may, optionally, be utilized to facilitate or promote the condensation of the energetic diol and the diacid halide. The polymerization promoter may, for example, comprise an acid scavenger formulated to neutralize acids formed during the condensation reaction between the energetic diol and the diacid halide. As a non-limiting example, the polymerization promoter may comprise an amine (e.g., a heteroaromatic amine, such as pyridine, 4-dimethylaminopyridine; a trialkylamine, such as triethylamine, tri-n-propylamine, diethyl-n-propylamine, tri-n-butylamine; triethylene diamine; etc.) formulated to neutralize hydrochloric acid (HCl) formed during the condensation reaction between the energetic diol and the diacid halide. In some embodiments, the polymerization promoter is pyridine ($C_5H_5N$). The use of the polymerization promoter may at least partially depend on the chemical properties of the energetic diol and/or the diacid halide utilized. For example, a polymerization promoter may be utilized if the diacid halide comprises a linear diacid chloride exhibiting a relatively shorter chain length, such as a chain length less than that of sebacoyl chloride. In additional embodiments, such as in embodiments where the diacid halide comprises a linear diacid chloride exhibiting a relatively longer chain length (e.g., a chain length greater than or equal to that of sebacoyl chloride), use of the polymerization promoter may, optionally, be omitted.

The reactants (e.g., the energetic diol, the diacid halide (and/or a derivative of the diacid halide), the polymerization promoter (if any), etc.) may be combined at one or more temperatures less than or equal to about 40° C., such as a temperature within a range of from about 10° C. to about 40° C., from about 20° C. to about 30° C., or about 25° C. A cooling means may, optionally, be employed during the energetic polymer formation processes of the disclosure to ensure that the temperature remains less than or equal to about 40° C. In addition, the reactants may be combined under an inert atmosphere (e.g., an atmosphere substantially free of oxygen and/or atmospheric moisture, such as under vacuum, within a nitrogen atmosphere, within a noble gas atmosphere, etc.), and may be agitated (e.g., mixed, stirred, etc.) for a sufficient period of time to form the energetic polymer (e.g., energetic polyester). Furthermore, at least one of the relative amounts of the reactants, the order in which the reactants are combined, and the rate in which at least one of the reactants is added to at least one other of the reactants may be selected to control the properties of the energetic polymer formed therefrom. By way of non-limiting example, and as described in further detail below, at least one of the relative amounts of the reactants, the addition order of the reactants, and the addition rate of at least one of the reactants may be selected to control at least one of the reactive capping groups and the molecular weight of the energetic polymer formed therefrom.

The amounts of the energetic diol and the diacid halide may be selected relative to one another to control the reactive capping groups of the energetic polymer formed therefrom. As used herein, the term "reactive capping group" means a functional group located at an end of the backbone of the energetic polymer and configured to react with another compound (e.g., an acrylate, vinyl ether, epoxide, alcohol, isocyanate, halogenated acid, etc.) to form a chemical bond under conventional reaction conditions, such as those employed in hydrosilylation, condensation, addition, esterification, etherification, Michael reaction, imidation, amination, sulfonation, and the like. One of the energetic diol and the diacid halide may, for example, be added in excess to the other of the energetic diol and the diacid halide to control the type of reactive capping groups exhibited by the energetic polymer.

For example, if it is desired to produce an energetic polymer exhibiting hydroxyl (—OH)-terminated reactive capping groups, greater than or equal to one molar equivalent of the energetic diol may be used relative to the diacid halide. The energetic diol may, for example, be added in molar excess to the diacid halide, such as up to about 50% molar excess relative to the diacid halide (e.g., from up to about 1.5 molar equivalent of the energetic diol relative to the diacid halide), from about 10% to about 30% molar excess relative to the diacid halide (e.g., from up to about 1.1 molar equivalent to about 1.3 molar equivalent of the energetic diol relative to the diacid halide), or about 20% molar excess relative to the diacid chloride (e.g., about 1.2 molar equivalent of the energetic diol relative to the diacid halide). In some embodiments, about 1.2 molar equivalent of energetic diol is combined with about 1.0 molar equivalent of diacid halide to produce a hydroxyl-terminated energetic polyester (e.g., an energetic polyester exhibiting energetic, hydroxyl-terminated reactive capping groups, such as beta-geminal dinitro alcohol moieties).

By way of non-limiting example, A-diol in excess may be condensed with a diacid halide (e.g., sebacoyl chloride) to produce a hydroxyl-terminated geminal dinitro polyester according to the following reaction scheme:

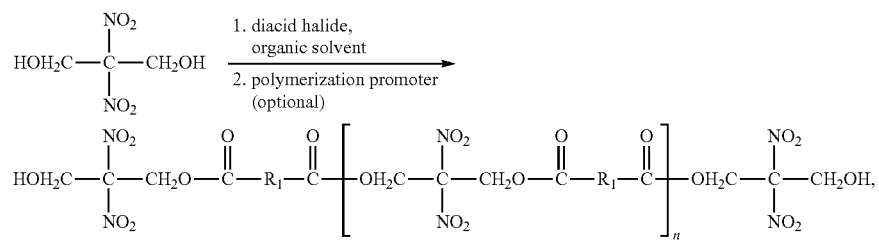

where n is an integer of from 1 to infinity; and each $R_1$ is independently an aliphatic linkage, a cyclic linkage, or a combination thereof. As used herein, the term "aliphatic linkage" means and includes a saturated or unsaturated, linear or branched hydrocarbon group, such as an alkylene group, an alkenylene group, and an alkynylene group. A suitable alkylene group may be a saturated linear or branched hydrocarbon group having from 1 to 10 carbon atoms, such as methylene, ethylene, 1,3-propylene, 1,2-buylene, 1,2-butylene, pentylene, hexylene, heptylene, octylene, nonylene, and decalene. A suitable alkenylene group may be an unsaturated linear or branched hydrocarbon group including from 2 to 10 carbon atoms and at least one carbon-carbon double bond. A suitable alkenylene group may be an unsaturated linear or branched hydrocarbon group including from 2 to 10 carbon atoms and at least one carbon-carbon triple bond. Optionally, the aliphatic group may include one or more heteroatom (i.e., an element other than carbon and hydrogen, such as oxygen, nitrogen, sulfur, or silicon). As used herein, the term "cyclic linkage" means and includes at least one closed ring hydrocarbon group, such as an alicyclic group, an arylene group, or a combination thereof. A suitable alicyclic group may be a closed ring hydrocarbon group including from 5 to 8 carbons, such as cyclopentylene, cyclohexylene, cycloheptylene, cyclooctylene, and alkyl-substituted derivatives thereof. A suitable arylene group may include a closed aromatic ring or closed aromatic ring system such as phenylene, biphenylene, napthylene, anthrylene, and alkyl-substituted derivatives thereof. Optionally, the cyclic linkage may include one or more heteroatom. By way of non-limiting example, the cyclic linkage may be a heteroarylene group, such as furylene, thienylene, pyridylene, isoquinolinylene, indolylene, isoindolylene, triazonlylene, pryrrolylene, tetrazolylene, imidazolylene, pyrazolylene, oxazolylene, thiazolylene, benzofuranylene, benzothiophenylene, carbazolylene, benzoxazolylene, pyrimidinylene, benzimidazolylene, quinozalinylene, benzothiazolylene, naphthyridinylene, isoxaolylene, isothiazolylene, purinylene, quinazolinylene, pyrazinylene, pyridazinylene, triazinylene, tetrazinylene, oxadiazolylene, and thiadiazolylene.

The use of a polymerization promoter (e.g., an amine, such as pyridine) in the above synthesis process may at least partially depend on the diacid halide utilized for the condensation reaction. For example, and as described in further detail below, in embodiments where the diacid halide comprises sebacoyl chloride (and/or a longer chain linear diacid chloride), the use of a polymerization promoter may, optionally, be omitted from the process of synthesizing the hydroxyl-terminated geminal dinitro polyester. As another example, in embodiments where the diacid halide comprises diacid halide exhibiting a shorter chain length than sebacoyl chloride (e.g., oxalyl chloride, malonyl chloride, succinyl chloride, glutaryl chloride, adipoyl chloride, pimeloyl chloride, suberoyl chloride, azelaoyl chloride, etc.), a polymerization promoter may be employed in the process of synthesizing the hydroxyl-terminated geminal dinitro polyester.

The detailed reaction scheme below illustrates a non-limiting example of a conversion of A-diol to a hydroxyl-terminated geminal dinitro polyester:

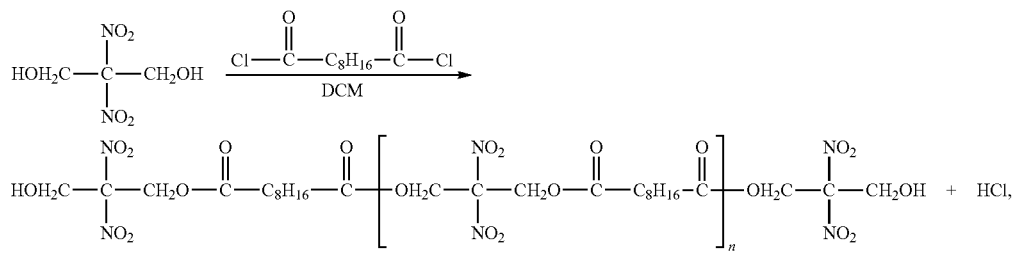

where n is defined as previously described. A-Diol in excess may be reacted with sebacoyl chloride in DCM to form a mixture including a hydroxyl-terminated geminal dinitro polyester and HCl.

As another example, if it is desired to produce an energetic polymer exhibiting carboxyl (—COOH)-terminated reactive capping groups, less than or equal to one molar equivalent of the energetic diol may be used relative to the diacid halide, and the resulting polymer (e.g., acid-halide-terminated polyester) may be hydrolyzed to form carboxyl-terminated reactive capping groups. The diacid halide may, for example, be added in molar excess to the energetic diol, such as up to about 50% molar excess relative to the energetic diol (e.g., from up to about 1.5 molar equivalent of the diacid halide relative to the energetic diol), from about 10% to about 30% molar excess relative to the energetic diol (e.g., from about 1.1 molar equivalent to about 1.3 molar equivalent of the diacid halide relative to the energetic diol), or about 20% molar excess relative to the energetic diol (e.g., about 1.2 molar equivalent of the diacid halide relative to the energetic diol). In some embodiments, about 1.2 molar equivalent of diacid halide is combined with about 1.0 molar equivalent of energetic diol to produce a carboxyl-terminated energetic polyester (e.g., an energetic polyester exhibiting carboxyl-terminated reactive capping groups) during aqueous workup.

By way of non-limiting example, A-diol may be condensed with a diacid halide (e.g., sebacoyl chloride) in excess to produce an acid-halide-terminated geminal dinitro polyester, which may then be hydrolyzed with water to produce a carboxyl-terminated geminal dinitro polyester according to the following reaction scheme:

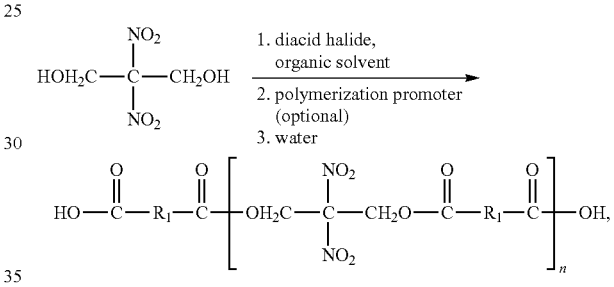

where n and $R_1$ are defined as previously described.

Similar to the process of synthesizing a hydroxyl-terminated geminal dinitro polyester, the use of a polymerization promoter (e.g., an amine, such as pyridine) in the above synthesis process may at least partially depend on the diacid halide utilized for the condensation reaction. For example, and as described in further detail below, in embodiments where the diacid halide comprises sebacoyl chloride (and/or a longer chain linear diacid chloride), the use of a polymerization promoter may, optionally, be omitted from the process of synthesizing the carboxyl-terminated geminal dinitro polyester. As another example, in embodiments where the diacid halide comprises a linear diacid halide exhibiting a shorter chain length than sebacoyl chloride (e.g., oxalyl chloride, malonyl chloride, succinyl chloride, glutaryl chloride, adipoyl chloride, pimeloyl chloride, suberoyl chloride, azelaoyl chloride, diglycolyl chloride, etc.), a polymerization promoter may be employed in the process of synthesizing the carboxyl-terminated geminal dinitro polyester.

The detailed reaction scheme below illustrates a non-limiting example of a conversion of A-diol to a carboxyl-terminated geminal dinitro polyester:

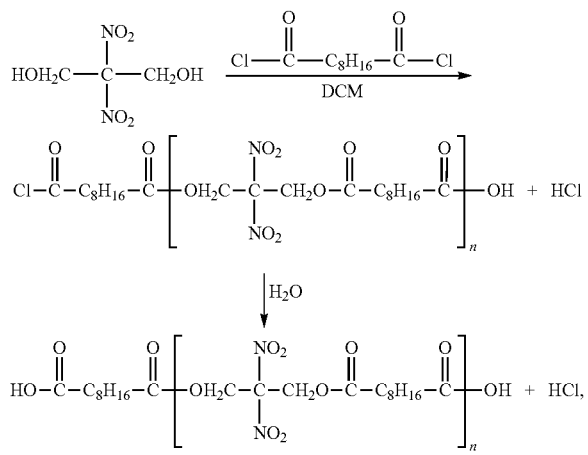

where n is defined as previously described. A-Diol may be reacted with excess sebacoyl chloride in DCM to form a mixture including an acid-chloride-terminated geminal dinitro polyester and HCl. Water may be added or introduced to the mixture to hydrolyze the acid-chloride-terminated geminal dinitro polyester and produce a carboxyl-terminated geminal dinitro polyester.

Optionally, in embodiments wherein the diacid halide is introduced in molar excess to the energetic diol, rather than hydrolyzing the acid-halide-terminated energetic polymer to produce a carboxyl-terminated energetic polymer, at least one acid scavenger (e.g., an amine, such as pyridine) and at least one non-energetic diol may be introduced to the acid-halide-terminated energetic polymer to produce an energetic polymer exhibiting non-energetic, hydroxyl-terminated reactive capping groups. The acid scavenger may neutralize acids produced with the acid-halide-terminated energetic polymer. In addition, in some embodiments, the acid scavenger may also react with remaining acid halide groups to form an acyl ammonium salt, as described in further detail below. The non-energetic, hydroxyl-terminated reactive capping groups may be more chemically stable than the energetic, hydroxyl-terminated reactive capping groups (e.g., beta-geminal dinitro alcohol moieties) produced by introducing excess energetic diol to the diacid halide. For example, the non-energetic, hydroxyl-containing reactive capping groups may be less susceptible to Retro-Henry type reactions (also known as "reverse Henry reactions") and decomposition in the presence of a base (e.g., such as a base that may be employed to subsequently crosslink the energetic polymer, and/or the acid scavenger added to facilitate the end-capping reaction) as compared to the energetic, hydroxyl-containing reactive capping groups. Accordingly, the non-energetic, hydroxyl-containing reactive capping groups may at least facilitate enhanced control of subsequent processing (e.g., cross-linking) of the energetic polymer. In addition, the non-energetic, hydroxyl-containing reactive capping groups may also enhance the thermal stability and aging characteristics of the energetic polymer.

Non-limiting examples of suitable non-energetic diols include 2,2-dimethyl-1,3-propanediol, ethylene glycol, propylene glycol, tetramethylene glycol, diethylene glycol, hexamethylene glycol, octamethylene glycol, decamethyene glycol, cyclopentylene-1,3-diol, cyclohexylene-1,2-diol, cyclohexylene-1,3-diol, cyclohexylene-1,4-diol, catechol, resorcinol, quinol, 1-methyl-2,4-benzenediol, 2-methyl-1,3-naphthalenediol, 2,4-toluenediol, xylylene-1,4-diol, xylylene-1,3-diol, 1,5-naphthalenedimethanol, 2-ethyl-1-phenyl-3-butene-1,2-diol, 2,2 di(4-hydroxyphenyl) propane, and triethylene glycol. In some embodiments, the non-energetic diol is ethylene glycol. Greater than or equal to a stoichiometric amount of the non-energetic diol may be employed to form the energetic polymer exhibiting non-energetic, hydroxyl-terminated reactive capping groups. In some embodiments, the non-energetic diol is introduced in five-fold (5×) excess with respect to the theoretical number of acid halide functional groups remaining after polymerization with the energetic diol.

By way of non-limiting example, A-diol may be condensed with a diacid halide (e.g., sebacoyl chloride) in excess to produce an acid-halide-terminated geminal dinitro polyester and some acid (e.g., HCl), an acid scavenger (e.g., pyridine) may be introduced to at least partially neutralize the produced acid (and, in some embodiments, form an acyl ammonium salt with remaining acid halide groups, as described in further detail below), and then a non-energetic diol (e.g., ethylene glycol) may be introduced to react with the acid-halide-terminated geminal dinitro polyester and produce a geminal dinitro polyester exhibiting non-energetic, hydroxyl-terminated reactive capping groups according to the following reaction scheme:

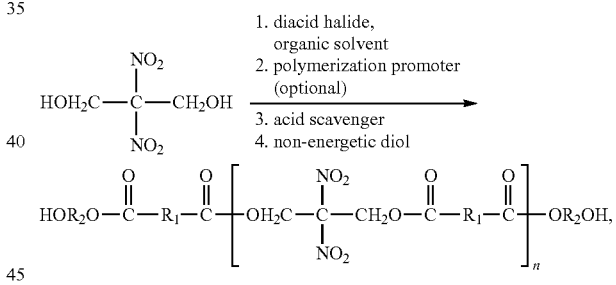

where n and $R_1$ are defined as previously described, and each $R_2$ is independently an aliphatic linkage, a cyclic linkage, or a combination thereof. Suitable aliphatic linkages and cyclic linkages for $R_2$ are described above with respect to $R_1$.

Similar to the process of producing a carboxyl-terminated energetic polyester, the use of a polymerization promoter (e.g., an amine, such as pyridine) in the above synthesis process (e.g., to form an acid-halide-terminated geminal dinitro polyester that is subsequently introduced to a non-energetic diol) may at least partially depend on the diacid halide utilized for the condensation reaction. For example, as described in further detail below, in embodiments where the diacid halide comprises sebacoyl chloride (and/or a longer chain linear diacid chloride), the use of a polymerization promoter may, optionally, be omitted from the process of synthesizing an acid-halide-terminated geminal dinitro polyester that is then introduced to an acid scavenger/acyl ammonium salt generator and a non-energetic diol to produce a geminal dinitro polyester exhibiting non-energetic, hydroxyl-terminated reactive capping groups. As another example, in embodiments where the diacid halide comprises diacid halide exhibiting a shorter chain than sebacoyl chloride (e.g., oxalyl chloride, malonyl chloride, succinyl chloride, glutaryl chloride, adipoyl chloride, pimeloyl chloride, suberoyl chloride, azelaoyl chloride, diglycolyl chloride, etc.), a polymerization promoter may be employed in the process of synthesizing an acid-halide-terminated geminal dinitro polyester that may then be introduced to a non-energetic diol to produce a geminal dinitro polyester exhibiting non-energetic, hydroxyl-terminated reactive capping groups. In such embodiments, an acid scavenger, such as additional amine (e.g., additional pyridine) may be introduced to the acid-halide-terminated geminal dinitro polyester before introducing the non-energetic diol to produce the geminal dinitro polyester exhibiting non-energetic, hydroxyl-terminated reactive capping groups, or the amount of polymerization promoter initially introduced to form the acid-halide-terminated geminal dinitro polyester may be sufficient to also produce the geminal dinitro polyester exhibiting non-energetic, hydroxyl-terminated reactive capping groups.

The detailed reaction scheme below illustrates a non-limiting example of a conversion of A-diol to a geminal dinitro polyester exhibiting non-energetic, hydroxyl-terminated reactive capping groups:

promoter, etc.) are combined with one another may be used to control the properties of the energetic polymer formed therefrom. For example, the order in which the various reagents are combined may be used to control the molecular weight of the energetic polymer formed therefrom, as well as the rate at which the energetic polymer is formed. In some embodiments, an energetic diol and a diacid halide are combined in an organic solvent, and then a polymerization promoter (e.g., an amine) is added thereto to neutralize produced acid and promote the production of a desired energetic polymer. In additional embodiments, an energetic diol and a polymerization promoter are combined in an organic solvent, and then a diacid halide is added thereto to produce a desired energetic polymer. In further embodiments, a diacid halide and a polymerization promoter are combined to produce an acyl ammonium salt, and then the acyl ammonium salt is combined with the energetic diol in an organic solvent to produce a desired energetic polymer. By way of non-limiting example, the reaction scheme below illustrates the formation of an acyl ammonium salt (i.e., which may be combined with an energetic diol) from a reaction between sebacoyl chloride and pyridine:

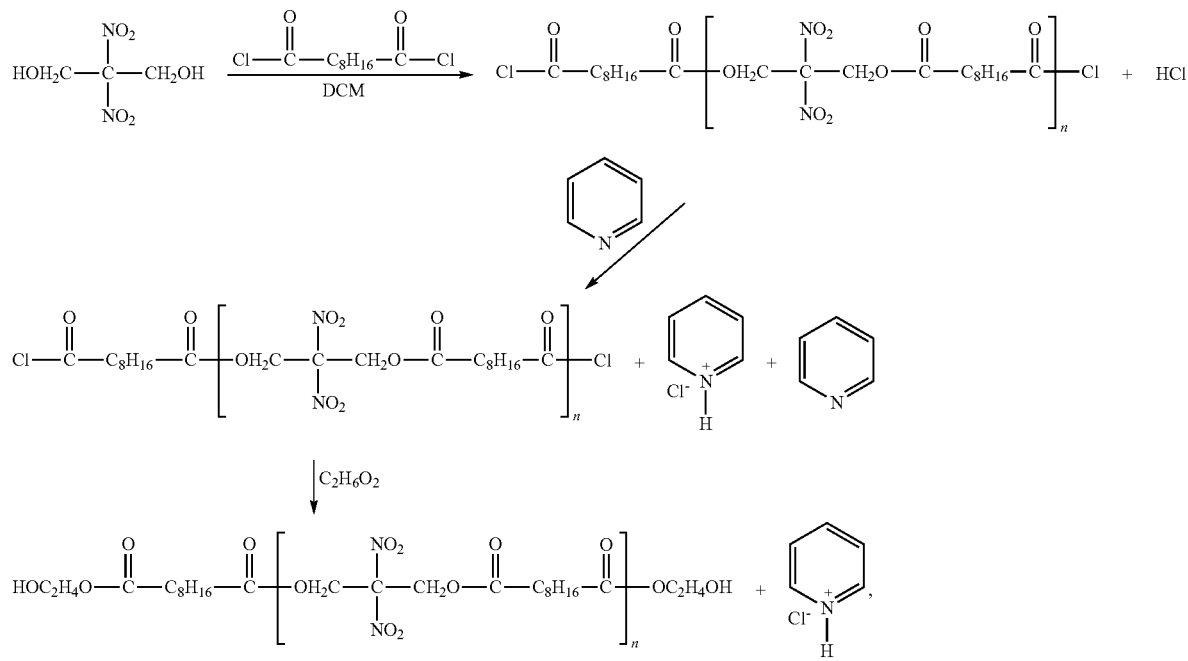

where n is defined as previously described. A-Diol may be reacted with excess sebacoyl chloride in DCM to form a mixture including an acid-chloride-terminated geminal dinitro polyester and HCl. Pyridine may be added or introduced to the mixture to neutralize the HCl. In some embodiments, the added pyridine may also form acyl ammonium salts with remaining acid chloride groups. Ethylene glycol may be added or introduced to the neutralized mixture to react with the acid-chloride-terminated geminal dinitro polyester (and/or acyl ammonium derivative thereof) and produce a geminal dinitro polyester exhibiting non-energetic, hydroxyl-terminated reactive capping groups.

At least one of the order and the rate at which various reagents (e.g., energetic diol, diacid halide, polymerization

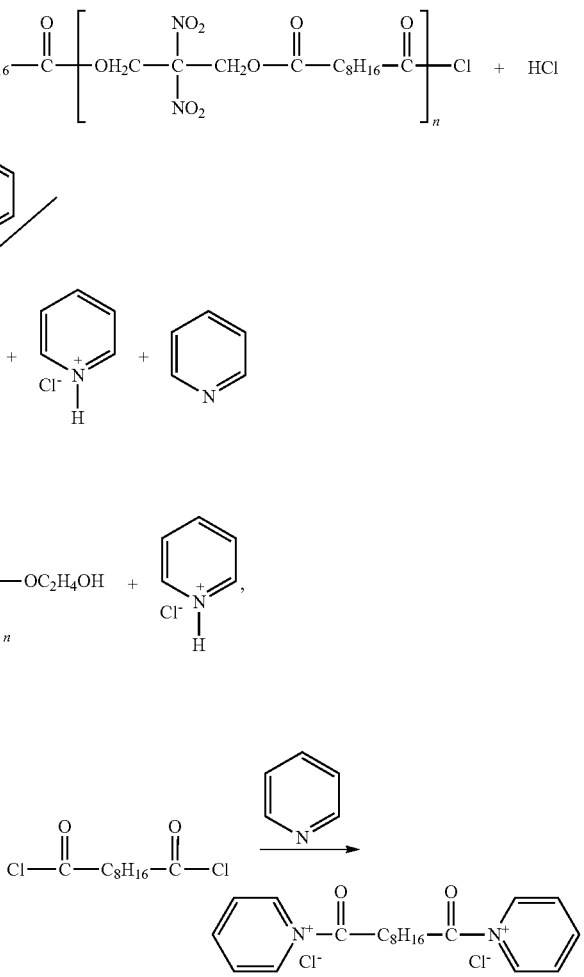

If desirable, the relatively increased reactivity of the acyl ammonium salt may increase at least one of the molecular weight and the rate of formation of an energetic polymer produced therefrom as compared to an energetic polymer produced either by combining the energetic diol and the diacid halide and then the adding polymerization promoter, or by combining the energetic diol and the polymerization promoter and then adding the diacid halide.

Following the production of the energetic polymer, the energetic polymer may be combined with at least one crosslinking/curing agent. The crosslinking/curing agent may facilitate the crosslinking of separate polymer chains of the energetic polymer to produce an energetic binder comprising a crosslinked energetic polymer. The energetic binder may be configured to provide structural integrity to a desired energetic composition, as described in further detail below. The crosslinking/curing agent may also facilitate close packing of crosslinked polymer chains of the energetic polymer. The type and amount of crosslinking/curing agent may at least partially depend on the energetic polymer produced and on desired properties of the energetic binder. For example, the amount of crosslinking/curing agent introduced to the energetic polymer may be selected at least partially based upon the degree of crosslinking and/or close packing desired. In some embodiments, the crosslinking/curing agent is introduced in molar excess to the energetic polymer, such as up to about 100% molar excess relative to the molar equivalents of reactive groups in the energetic polymer (e.g., from up to about 2.0 molar equivalents of the crosslinking/curing agent relative to the molar equivalents of reactive groups in the energetic polymer), from about 25% molar excess to about 100% molar excess relative to the molar equivalents of reactive groups in the energetic polymer (e.g., from about 1.2 molar equivalents to about 2.0 molar equivalents of the crosslinking/curing agent relative to the molar equivalents of reactive groups in the energetic polymer), or from about 50% molar excess to about 100% molar excess relative to the molar equivalents of reactive groups in the energetic polymer (e.g., from about 1.5 molar equivalents to about 2.0 molar equivalents of the crosslinking/curing agent relative to the molar equivalents of reactive groups in the energetic polymer).

As a non-limiting example, if the energetic polymer comprises a hydroxyl-terminated energetic polymer (e.g., a geminal dinitro polyester exhibiting energetic, hydroxyl-terminated reactive capping groups; a geminal dinitro polyester exhibiting non-energetic, hydroxyl-terminated reactive capping groups; etc.), the crosslinking/curing agent may comprise a compound including at least two groups configured to react with hydroxyl groups, such as a polyisocyanate compound. Suitable polyisocyanate compounds include, but are not limited to, diisocyanate compounds (e.g., a polymethylene diisocyanate, such as ethylene diisocyanate, hexamethylene diisocyanate, tetramethylene diisocyanate; alkylene diisocyanates, such as propylene-1,2-diisocyanate; cycloalkylene diisocyanates, such as 1,4-diisocyanate cyclohexane; aromatic diisocyanates, such as p-phenylene diisocyanate, m-phenylene diisocyanate, toluene diisocyanate, p,p'-diphenyl diisocyanate, and 1,5-naphthalene diisocyanate; and aliphatic aromatic diisocyanates, such as p,p'-diphenyl methane diisocyanate, and phenylethylene diisocyanate; etc.), triisocyante compounds, or combinations thereof. For example, a hydroxyl-terminated geminal dinitro polyester may be reacted with a diisocyanate to form a geminal dinitro polyurethane according to the following reaction scheme:

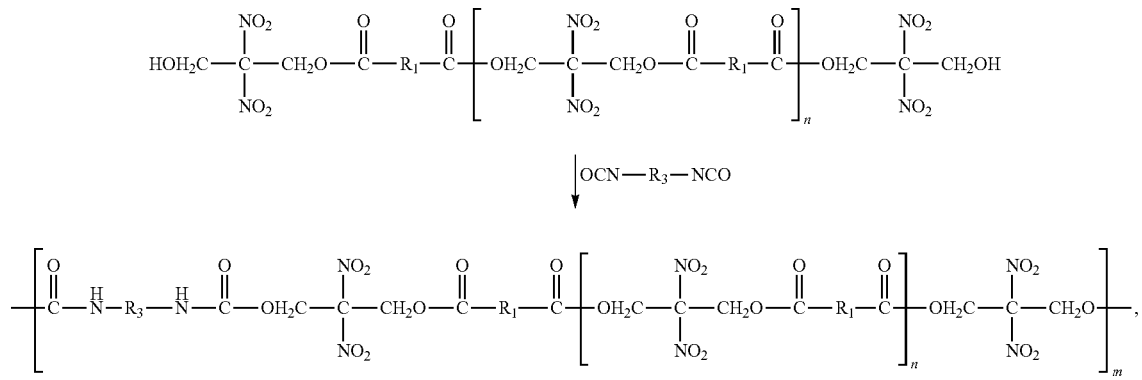

where n is defined as previously described; each $R_1$ is independently defined as previously described; $R_3$ is an aliphatic linkage, a cyclic linkage, or a combination thereof; and m is an integer of from 1 to infinity. Suitable aliphatic linkages and cyclic linkages for $R_3$ are described above with respect to $R_1$.

As another non-limiting example, if the energetic polymer comprises a carboxyl-terminated energetic polymer (e.g., a geminal dinitro polyester exhibiting carboxyl-terminated reactive capping groups), the crosslinking/curing agent may comprise a compound including at least two groups configured to react with carboxyl groups, such as a polyepoxide compound. Suitable polyepoxide compounds include, but are not limited to, diepoxide compounds (e.g., 1,3-butadiene diepoxide; liquid epoxy resins, such as bisphenol A diglycidyl ether (BADGE) epoxy resin, and bisphenol F diglycidyl ether (BFDGE) epoxy resin; etc.), triepoxide compounds, or combinations thereof. Suitable polyepoxide compounds are commercially available from numerous sources including, but not limited to, Dow Chemical Company (Midland, Mich.). A catalyst (e.g., a ferric compound, such as ferric acetylacetonate, ferric chloride hexahydrate, etc.) may, optionally, be employed to promote (e.g., accelerate) epoxy-carboxy reactions. For example, a carboxyl-terminated geminal dinitro polyester may be reacted with a diepoxide to form a crosslinked geminal dinitro polyester according to the following reaction scheme:

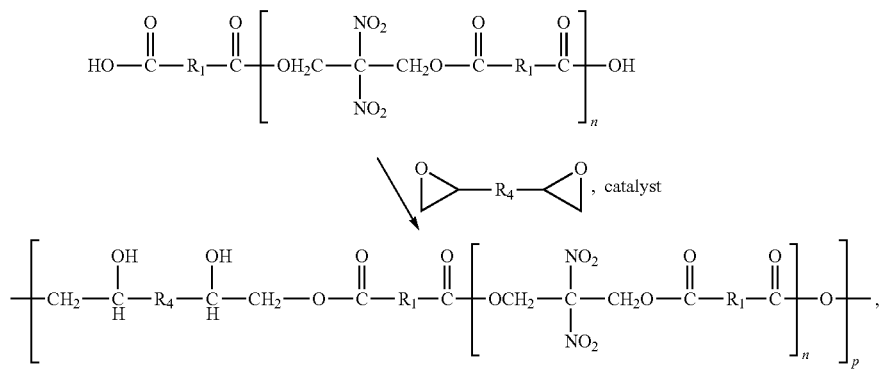

where n is defined as previously described; each $R_1$ is independently defined as previously described; $R_4$ is an aliphatic linkage, a cyclic linkage, or a combination thereof; and p is an integer of from 1 to infinity. Suitable aliphatic linkages and cyclic linkages for $R_4$ are described above with respect to $R_1$.

The energetic binders formed in accordance with embodiments of the disclosure may be utilized as desired. For example, an energetic binder formed according to embodiments of the disclosure may be combined with another energetic material to produce an energetic composition (e.g., an energetic formulation), such as an explosive composition or a propellant composition. The another energetic material may comprise at least one of a crystalline energetic material and a non-crystalline energetic material including, but not limited to, crystalline and non-crystalline forms of 1,3,5-triaza-1,3,5-trinitrocyclohexane (RDX), 1,3,5,7-tetraaza-1,3,5,7-tetranitrocyclooctane (HMX), 2,4,6-trinitrotoluene (TNT), 2,4,6-triamino-1,3,5-trinitrobenzene (TATB), 3-nitro-1,2,4-triazol-5-one (NTO), 4,10-Dinitro-2,6,8,12-tetraoxa-4,10-diaza-tetracyclododecane (TEX), 1,1-diamino-2,2-dinitroethene (FOX-7), 2,4,6,8,10,12-hexanitro-2,4,6,8,10,12-hexaazaisowurtzitane (CL-20), nitroguadine (NQ), 1,3,3-trinitroazetidine (TNAZ), guanylurea dinitramide (FOX-12), hexanitrostilbene (HNS), ammonium dinitramide (ADN), diaminoazoxy furazan (DAAOF), triaminoguanidinium azotetrazolate (TAGzT), or combinations thereof. Other materials (e.g., an oxidizer, a burn rate catalyst, a plasticizer, etc.) may also be included in the energetic composition. The energetic binder may provide the energetic composition enhanced properties (e.g., enhanced detonation velocity, enhanced propellant impulse, etc.) as compared to conventional energetic compositions. The energetic composition may, in turn, be utilized as desired. For example, the energetic composition may be utilized as an explosive charge for a warhead of an explosive ordnance (e.g., rocket, missile, artillery round, caseless ammunition, etc.) configured to be detonated at a specific time in an effort to defeat at least one target.

The methods of the disclosure facilitate the simple, cost-effective, and controllable formation of energetic polymers (e.g., geminal ditro polyesters, crosslinked geminal dinitro polyesters, geminal dinitro polyurethanes, etc.) exhibiting desirable properties (e.g., molecular weight, viscosity, reactive capping groups, energetic performance, sensitivity, etc.). The methods of the disclosure may also facilitate the formation of energetic binders and energetic compositions that exhibit improved properties as compared to energetic binders and energetic compositions not formed through the methods of the disclosure, resulting in relatively improved energetic (e.g., explosive, propulsive, etc.) ordnance. The methods of the disclosure may also reduce the number of processing acts and the number of materials required to produce energetic polymers as compared conventional methods, thereby reducing costs (e.g., processing costs, material costs, labor costs, etc.), increasing efficiency (e.g., faster production time), increasing yield, and enhancing safety (e.g., through reduced exposure) relative to such conventional methods.

The following examples serve to explain embodiments of the disclosure in more detail. These examples are not to be construed as being exhaustive or exclusive as to the scope of the disclosure.

EXAMPLES

Example 1

Synthesis of Energetic Polymer from Sebacoyl Chloride and A-Diol

Sebacoyl chloride (299.5 grams (g), 1252.4 millimol (mmol)) and DCM (2695 milliliters (mL)) were added to a 5 liter (L) round bottom flask with a nitrogen ($N_2$) sweep to form a mixture. While stirring the mixture, solid A-diol (166.4 g, 1001.9 mmol) was then added, followed by additional DCM (300 mL), to form a reaction solution. The reaction solution was stirred for about 16 h, and was then chilled in an ice bath. A solution of pyridine (203 mL, 2515 mmol) in DCM (203 mL) was added at a rapid dropwise rate to the chilled reaction solution (total addition time was about 1.5 h). The ice bath was removed once all of the pyridine was added. 4 h after all the pyridine was added, the reaction solution was added via cannula to a solution of ethylene glycol (139.41, 2499.8 mmol) in THF (140 mL) in a 6 L Erlenmeyer flask. The transfer took about 2 h. The mixture was stirred for about 16 h under a stream of $N_2$. Thereafter, the Erlenmeyer was filled to capacity with distilled water (2 L) and permitted to stir (170 rpm) for 2 h. An aqueous layer was decanted and the reaction solution was washed again in the Erlenmeyer with water (2 L, 1.5 h), 10% HCl (2 L, 1.5 h), water (2 L, 1 h), brine (2 L, 1 h). The organic solution was dried over magnesium sulfate ($MgSO_4$) and then the volatiles were removed using a rotary evaporatory yielding clear yellow/orange viscous liquid polymer. Gel permeation chromatography (GPC) analysis of the product yielded $M_n$=2651 daltons (Da); $M_w$=5708 Da; and $M_p$=6280 Da.

Example 2

Synthesis of Energetic Polymer from Acyl Ammonium Salt

Under an $N_2$ atmosphere, sebacoyl chloride (316 g) and DCM (1500 mL) were added to a round bottom flask with $N_2$ sweep to form a mixture. While stirring the mixture, a solution of pyridine (209 g) in DCM (200 mL) was added and the resulting solution was chilled. With the solution between about 0° C. and about 10° C., A-diol (175 g) was added at a rate permitting the temperature to stay below about 39° C. After about 16 h, a solution of ethylene glycol (160 g) in THF (200 g) was rapidly added to the solution and allowed to stir for 4 h. Thereafter, the solution was washed with water (3×2 L) and brine (2 L), and was then dried over $MgSO_4$. The solvent was removed by evaporation to yield elastic rubbery solid orange/brown polymer that softened upon gentle heating but was insoluble in analytical solvents.

Example 3

Synthesis of Energetic Polymer End-Capped with A-Diol

Under an $N_2$ atmosphere, sebacoyl chloride (14.1 g) was added to DCM (100 mL) in a round bottom flask to form a mixture. A-diol (11.75 g) was added to the mixture and stirred for about 16 hours. The resulting clear light yellow solution was washed with water (2×100 mL), 10% aqueous sodium bicarbonate (2×100 mL), water (100 mL), and then brine (100 mL). The organic solution was dried over $MgSO_4$ and then stripped of solvent to yield clear orange/brown liquid polymer. GPC analysis of the product yielded $M_n=2002$ Da; $M_w=4071$ Da; and $Mp=4213$ Da.

Example 4

Synthesis of Energetic Polymer from Adipoyl Chloride and A-Diol

Under an $N_2$ atmosphere, pyridine (3.65 mL) was added to a solution of Adiol (3 g) in THF (21 mL). The resulting solution was chilled in an ice bath and a solution of adipoyl chloride (4.13 g) in THF (21 mL) was added dropwise (about 1 drop/second). The solution was stirred for about 16 h. Thereafter, it was observed that the solution had turned yellow and a significant amount white solid was still visible. The solid was separated by reduced pressure filtration and the filtrate was added to a solution of stirring ethylene glycol (1.4 g) in THF 1.4 (mL). The clear yellow solution was stirred for 6 h and then added all at once into a beaker of distilled water (200 mL). After stirring for about 30 min, the water was decanted and the remaining crude polymer was dissolved in DCM. The polymeric solution was transferred to a separatory funnel and washed with water (150 mL), brine (150 mL), and then dried over $MgSO_4$. The drying agent was separated by filtration and the volatiles were removed from the filtrate by evaporation to yield orange/brown viscous liquid polymer. GPC analysis of the product yielded $M_n=2308$ Da; $M_w=4244$ Da; and $Mp=4360$ Da.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the disclosure as encompassed by the following appended claims and their legal equivalents.

What is claimed is:

1. A method of producing an energetic polymer, comprising:
    combining, under a nitrogen gas atmosphere, a mixture consisting of a diacid chloride and an organic solvent with a solution consisting of an amine and the organic solvent to react the diacid chloride with the amine and form an acyl ammonium salt; and
    reacting 2,2-dinitro-1,3-propanediol with the acyl ammonium salt to produce a geminal dinitro polyester.

2. The method of claim 1, wherein reacting 2,2-dinitro-1,3-propanediol with the acyl ammonium salt comprises reacting the 2,2-dinitro-1,3-propanediol with the acyl ammonium salt in the presence of at least one acid scavenger.

3. The method of claim 2, wherein reacting the 2,2-dinitro-1,3-propanediol with the acyl ammonium salt in the presence of at least one acid scavenger comprises reacting the 2,2-dinitro-1,3-propanediol with the acyl ammonium salt in the presence of pyridine.

4. The method of claim 2, wherein reacting the 2,2-dinitro-1,3-propanediol with the acyl ammonium salt in the presence of at least one acid scavenger comprises:
    combining the 2,2-dinitro-1,3-propanediol with the acyl ammonium salt to form a reaction solution; and
    introducing the at least one acid scavenger into the reaction solution.

5. The method of claim 1, wherein reacting the 2,2-dinitro-1,3-propanediol with the acyl ammonium salt in the presence of at least one acid scavenger comprises:
    combining the 2,2-dinitro-1,3-propanediol with the at least one acid scavenger to form a mixture; and
    introducing the acyl ammonium salt into the mixture.

6. The method of claim 1, wherein reacting 2,2-dinitro-1,3-propanediol with the acyl ammonium salt comprises introducing the 2,2-dinitro-1,3-propanediol in molar excess to the acyl ammonium salt to produce the geminal dinitro polyester, the geminal dinitro polyester exhibiting energetic, hydroxyl-terminated reactive capping groups.

7. The method of claim 1, wherein reacting 2,2-dinitro-1,3-propanediol with the acyl ammonium salt comprises:
    introducing the acyl ammonium salt in molar excess to the 2,2-dinitro-1,3-propanediol to form an acid-halide-terminated geminal dinitro polyester; and
    hydrolyzing the acid-halide-terminated geminal dinitro polyester to produce the geminal dinitro polyester, the geminal dinitro polyester exhibiting carboxyl-terminated reactive capping groups.

8. The method of claim 1, wherein reacting 2,2-dinitro-1,3-propanediol with the acyl ammonium salt comprises:
    introducing the acyl ammonium salt in molar excess to the 2,2-dinitro-1,3-propanediol to produce an acid-halide-terminated geminal dinitro polyester; and
    reacting the acid-halide-terminated geminal dinitro polyester with at least one non-energetic diol to produce the geminal dinitro polyester, the geminal dinitro polyester exhibiting non-energetic, hydroxyl-terminated reactive capping groups.

9. The method of claim 8, further comprising introducing at least one acid scavenger to the acid-halide-terminated geminal dinitro polyester prior to reacting the acid-halide-terminated geminal dinitro polyester with the non-energetic diol.

10. A method of producing an energetic binder, comprising:
combining, under a nitrogen gas atmosphere, a mixture consisting of a diacid chloride and an organic solvent with a solution consisting of an amine and the organic solvent to react the diacid chloride with the amine and form an acyl ammonium salt; and
reacting 2,2-dinitro-1,3-propanediol with the acyl ammonium salt to produce a geminal dinitro polyester; and
crosslinking polymer chains of the geminal dinitro polyester.

11. The method of claim 10, wherein reacting 2,2-dinitro-1,3-propanediol with the acyl ammonium salt to produce the geminal dinitro polyester comprises forming the geminal dinitro polyester to exhibit hydroxyl-terminated reactive capping groups.

12. The method of claim 11, wherein crosslinking polymer chains of the geminal dinitro polyester comprises reacting the geminal dinitro polyester with at least one polyisocyanate to produce a geminal dinitro polyurethane.

13. The method of claim 11, wherein forming the geminal dinitro polyester to exhibit hydroxyl-terminated reactive capping groups comprises forming the geminal dinitro polyester to exhibit non-energetic, hydroxyl-terminated reactive capping groups.

14. The method of claim 10, wherein reacting 2,2-dinitro-1,3-propanediol 1 with the acyl ammonium salt to produce the geminal dinitro polyester comprises forming the geminal dinitro polyester to exhibit carboxyl-terminated reactive capping groups.

15. The method of claim 14, wherein crosslinking polymer chains of the geminal dinitro polyester comprises reacting the geminal dinitro polyester with at least one polyepoxide to produce a crosslinked geminal dinitro polyester.

16. A method of producing an energetic composition, comprising:
combining, under a nitrogen gas atmosphere, a mixture consisting of a diacid chloride and an organic solvent with a solution consisting of an amine and the organic solvent to react the diacid chloride with the amine and form an acyl ammonium salt; and
reacting 2,2-dinitro-1,3-propanediol with the acyl ammonium salt to produce a geminal dinitro polyester;
crosslinking polymer chains of the geminal dinitro polyester to produce an energetic binder; and
combining the energetic binder with at least one additional energetic material.

17. The method of claim 16, wherein combining the energetic binder with at least one additional energetic material comprises combining the energetic binder with at least one of a crystalline form and a non-crystalline form of at least one of RDX, HMX, TNT, TATB, NTO, TEX, FOX-7, CL-20, NQ, TNAZ, FOX-12, HNS, AND, DAAOF, and TAGzT.

18. The method of claim 1, wherein reacting 2,2-dinitro-1,3-propanediol with the acyl ammonium salt to produce a geminal dinitro polyester comprises reacting the 2,2-dinitro-1,3-propanediol with an acyl ammonium salt derived from sebacoyl chloride.

19. The method of claim 1, further comprising selecting the diacid chloride from the group consisting of oxalyl chloride, glutaryl chloride, adipoyl chloride, suberoyl chloride, azelaoyl chloride, and diglycolyl chloride.

20. The method of claim 1, wherein a diacid chloride amine to form an acyl ammonium salt comprises selecting the amine from the group consisting of triethylene diamine and triethylamine.

21. The method of claim 1, further comprising selecting the organic solvent to comprise a non-carbonyl-containing polar aprotic organic solvent.

22. The method of claim 8, further comprising selecting the at least one non-energetic diol from the group consisting of 2,2-dimethyl-1,3-propanediol, ethylene glycol, propylene glycol, tetramethylene glycol, diethylene glycol, hexamethylene glycol, octamethylene glycol, decamethylene glycol, cyclopentylene-1,3-diol, cyclohexylene-1,2-diol, cyclohexylene-1,3-diol, cyclohexylene-1,4-diol, catechol, resorcinol, quinol, 1-methyl-2,4-benzenediol, 2-methyl-1,3-naphthalenediol, 2,4-toluenediol, xylylene-1,3-diol, 1,5 naphthalenedimethanol, 2-ethyl-1-phenyl-3-butene-1,2-diol, 2,2 di(4-hydroxyphenyl) propane, and triethylene glycol.

* * * * *

UNITED STATES PATENT AND TRADEMARK OFFICE
CERTIFICATE OF CORRECTION

PATENT NO. : 10,696,786 B2
APPLICATION NO. : 14/567334
DATED : June 30, 2020
INVENTOR(S) : Nicholas A. Straessler, Daniel W. Doll and Michael O. Killpack Page 1 of 1

It is certified that error appears in the above-identified patent and that said Letters Patent is hereby corrected as shown below:

In the Specification
Column 2, Line 50, change "more restrictive teams" to --more restrictive terms--

In the Claims
Claim 20, Column 20, Line 23, change "wherein a diacid chloride amine" to --wherein reacting a diacid chloride with an amine--
Claim 20, Column 20, Line 24, change "amine to form" to --amine in the absence of any energetic diols to form--
Claim 22, Column 20, Line 34, change "decamethylene glycol," to --decamethyene glycol,--
Claim 22, Column 20, Line 38, change "xylylene-1,3-diol" to --xylylene-1,4-diol, xylylene-1,3-dio--

Signed and Sealed this
Third Day of November, 2020

Andrei Iancu
*Director of the United States Patent and Trademark Office*